(12) United States Patent
Takada et al.

(10) Patent No.: US 8,731,056 B2
(45) Date of Patent: May 20, 2014

(54) IMAGE ENCODING APPARATUS, IMAGE ENCODING METHOD, AND IMAGE ENCODING PROGRAM

(76) Inventors: Yousuke Takada, Kobe (JP); Tomonori Matsuzaki, Kobe (JP)

( * ) Notice: Subject to any disclaimer, the term of this patent is extended or adjusted under 35 U.S.C. 154(b) by 434 days.

(21) Appl. No.: 13/127,033

(22) PCT Filed: Oct. 22, 2009

(86) PCT No.: PCT/JP2009/005548
§ 371 (c)(1),
(2), (4) Date: Apr. 29, 2011

(87) PCT Pub. No.: WO2010/050157
PCT Pub. Date: May 6, 2010

(65) Prior Publication Data
US 2011/0206121 A1    Aug. 25, 2011

(30) Foreign Application Priority Data
Oct. 30, 2008   (JP) ................................. 2008-280228

(51) Int. Cl.
*H04N 7/50* (2006.01)
*H04N 7/26* (2006.01)

(52) U.S. Cl.
CPC ...................................... *H04N 19/00* (2013.01)
USPC .............. 375/240.12; 375/E7.141; 375/E2.11

(58) Field of Classification Search
CPC ....................................................... H04N 19/00
USPC ................................... 375/240; 382/232–275
See application file for complete search history.

(56) References Cited

U.S. PATENT DOCUMENTS

| | | | |
|---|---|---|---|
| 5,214,506 A | | 5/1993 | Lin et al. |
| 5,818,529 A | * | 10/1998 | Asamura et al. ......... 375/240.23 |
| 5,959,675 A | * | 9/1999 | Mita et al. ................ 375/240.04 |
| 6,674,897 B1 | | 1/2004 | Sugisaki et al. |

FOREIGN PATENT DOCUMENTS

| | | |
|---|---|---|
| EP | 0697792 | 2/1996 |
| EP | 1217583 | 6/2002 |

OTHER PUBLICATIONS

"Test Model 5 (Test Model Editing Committee)", Joint Video Team (JVT) of ISO/IEC MPEG & ITU-T VCEG (ISO/IEC JTC1/SC29/WG11 and ITU-T SG16 Q6), XX, XX, No. AVC-491b, Mar. 27, 1993, XP0300000486.

"Information Technology—Generic Coding of Moving Pictures and Associated Audio Information: Video", ITU-T Recommendation H.262, XX, XX, Feb. 1, 2000, pp. I-IX,01, XP001030192.

(Continued)

*Primary Examiner* — Tung Vo
*Assistant Examiner* — Nguyen Truong
(74) *Attorney, Agent, or Firm* — Arent Fox LLP

(57) ABSTRACT

It is an object of the present invention to provide an image encoding apparatus, an image encoding method, and an image encoding program, which can homogenize image quality of an image as a whole without lowering encoding efficiency, being operable at high speed, and reduce the size of circuit scale by performing macroblock shuffling without changing slice structure. Provided is an image encoding apparatus, including: a shuffling portion which collects and shuffles a plurality of macroblocks constituting image data from respective positions within an image; an encoding portion which performs space-frequency transform and entropy encoding on the plurality of macroblocks collected and shuffled by the shuffling portion, as a base unit; and a rate control portion which controls the encoding portion to adjust the rate of the plurality of macroblocks after the encoding.

12 Claims, 8 Drawing Sheets

(56) References Cited

OTHER PUBLICATIONS

Kibey, S., "Variance based bit allocation algorithm to improve the TM5 rate control model of MPEG-2", Signal Processing and Information Technology, 2003. ISSPIT 2003. Proceedings of the $3^{rd}$ IEEE International Symposium on Darmstadt, Germany Dec. 14-17, 2003, Piscataway, NJ, USA, IEEE, Dec. 14, 2003, pp. 688-691, XP010729248 (ISBN: 978-0-7803-8292-3).

Ngan, K. N., et al., "HVS-Weighted Cosine Transform Coding Scheme with Adaptive Quantization" Proceedings of the SPIE—The International Society for Optical Engineering, SPIE, US, vol. 1001, No. Part 01, Jan. 1, 1998, pp. 702-708, XP000938054 (ISBN: 0277-786X).

Sony Corp: "DVCAM Format Overview", Internet Citation 2000, Retrieved from the Internet: URL:http://www.sony.ca/dvcam/pdfs/dvcam%20format%20overview.pdf, XP002331770.

International Search Report for International Application No. PCT/JP2009/005548, mailed Mar. 29, 2010, 4 pages.

* cited by examiner

IMAGE ENCODING APPARATUS, IMAGE ENCODING METHOD, AND IMAGE ENCODING PROGRAM

CROSS-REFERENCE TO RELATED APPLICATIONS

This application is a United States National Stage Application under 35 U.S.C. §371 of International Patent Application No. PCT/JP2009/005548, filed Oct. 22, 2009, which claims the benefit to Japanese Patent Application No. 2008-280228, filed Oct. 30, 2008, each of which is incorporated by reference into this application as if fully set forth herein.

TECHNICAL FIELD

The present invention relates to an image processing technology, and more specifically, to an image encoding apparatus, an image encoding method, and an image encoding program.

BACKGROUND ART

In technology for digitally processing moving images, methods for compressing and encoding a large amount of information include a standard ISO/IEC 13818, also known as MPEG-2, as an encoding method for digital video and accompanying audio. Part 2 of MPEG-2 (ISO/IEC 13818-2) specifies video coding. Bitstreams generated in compliance with the standard of MPEG-2 as above are widely used in communication, television broadcasting and the like (See Non-Patent Document 1).

A bitstream compliant with MPEG-2 has, from the highest sequence layer, a hierarchical structure and includes a GOP (Group of Pictures) layer, a picture layer, a slice layer, a macroblock layer, and a block layer.

In MPEG-2, each image frame is stored in a frame memory when processing moving images constituted by a series of a plurality of images, the temporal redundancy is exploited by taking a motion compensated difference between frames, and moreover, discrete cosine transform (hereinafter abbreviated as "DCT") is applied to the plurality of pixels constituting each frame so as to exploit the spatial redundancy and to realize efficient compression and encoding of moving images.

An encoded signal is transmitted to a decoder so as to be decoded and played back. MPEG-2 generally realizes its high compression ratio using inter-frame coding. In the decoder, the image frame is decoded and stored in a first frame memory, an image frame to succeed is predicted on the basis of motion information and stored in a second frame memory, and an image frame to be inserted between them is further predicted from the two frames so as to constitute a series of image frames and reconstruct moving images. The above method is called bidirectional prediction.

In MPEG-2, in order to realize this bidirectional prediction, three types of frames, namely, an I-frame, a P-frame, and a B-frame, are defined. An I-frame indicates an intra-coded frame and is an image encoded as a still image independently of the other frames. A P-frame indicates a forward predictive coded frame and is an image predicted and encoded on the basis of an I-frame or a P-frame located in the past. A B-frame indicates a bidirectionally predictive coded frame and an image predicted and encoded on the basis of forward and backward, or bi-directional, frames, each of which is an I-frame or a P-frame located in the past or the future. That is, after the I-frames and the P-frames are first encoded, then the B-frames to be inserted between them are encoded (See Non-Patent Document 2).

Since the inter-frame coding has a characteristic that compression is performed using correlation between continuous frames, an image quality can easily deteriorate if compression and decompression are repeated. Therefore, in video editing systems or video servers requiring high image quality, only intra-frame coding is used in some cases. For example, there is a case in which only I (intra) frames are used in MPEG-2. In MPEG-2, rate control is generally executed by the unit of GOP including a plurality of frames such as P-frames and B-frames in addition to I-frames; a rate control method similar to the above can be applied to the encoding of only I-frames, hereinafter referred to as "I-frame-only encoding".

An MPEG-2 bitstream encoded by an encoder is sent out to a transmission path operable at a predetermined transfer rate, input to a decoder on the transmission path, and then decoded to be later played back. However, the amount of information, i.e. the entropy, of moving picture signals is not constant. In order to encode the moving picture signals and send out the encoded moving picture signals in the form of bitstream to the transmission path at a fixed rate, it is necessary to carry out rate control so that the encoded signals will have constant entropy.

A prior-art rate control of image encoding will be described referring to FIG. 8. A prior-art image encoding apparatus 100 shown in FIG. 8 is provided with an input portion 101 to which digitized image data is input, a blocking processing portion 102, an encoding portion 103, a FIFO buffer 104, a rate control portion 105, and an output portion 106. The blocking processing portion 102 partitions image data input from the input portion 101 into blocks and generates macroblocks which are base units of encoding. The encoding portion 103 applies DCT transform, quantization, and variable-length encoding on the macroblocks generated by the blocking processing portion 102 and generates a bitstream. The FIFO buffer 104 temporarily accumulates the bitstream supplied from the encoding portion 103 and outputs it through the output portion 106. The rate control portion 105 carries out a feedback rate control for controlling quantization parameters used by the encoding portion 103 for quantization processing of the subsequent image data on the basis of the occupancy of the FIFO buffer 104. The quantization parameters influence the coarseness or fineness of the quantization, and the coarseness or fineness of the quantization directly influences the number of bits encoded per second. If the quantization becomes coarse, less data is maintained, and a quality of the encoded image data is deteriorated. If the quantization becomes fine, more data is maintained and the quality of image encoding is improved. However, if the quantization is too fine, the number of encoded bits per second exceeds an allocated band width, and rate control needs to be applied again so as to fit in a limited band width.

Since a high bit rate is required for I-frame-only encoding, the decoder buffer does not have enough room in many cases. Therefore, since a stricter rate control is required for I-frame-only encoding, rate control takes more time than usual. In addition, since the rate of I-frames may differ frame by frame due to the nature of the feed-back rate control, particularly as a result of editing such as scene change, cut, insert and the like, the rate increases instantaneously, which might result in violation of the constraint of buffer management and thus a buffer failure.

A DV codec does not have the above problem since the rate control is executed so that the I-frames become the same size. In order to efficiently carry out the rate control, a method called macroblock shuffling is used (for example, see Patent Document 1). The macroblock is an assembly of DCT blocks representing luminance and chrominance. Since MPEG-1 and MPEG-2 also have ones corresponding to the macroblock, the "macroblock" herein is assumed to refer to any of those corresponding to the macroblock of MPEG-1 and MPEG-2.

In the macroblock shuffling, a plurality of, for example, five pieces of the macroblocks located at spatially random positions are collected and then encoded. Here, a code length of an encoded macroblock is referred to as a "rate of a macroblock". A rate control is performed so that a rate of the macroblocks thus collected and encoded does not exceed a target rate. The assembly of macroblocks collected as above is referred to as a "segment". By the above mentioned rate control, bits are fairly allocated to the whole image data while the rate control is performed on a small unit of the segment. In addition, since the number of macroblocks included in a segment can be made small, the rate control can be executed at a high speed, and a required circuit scale can be made small.

CITATION LIST

Patent Literature
PTL 1: Japanese Unexamined Patent Application Publication No. H11-298896
Non Patent Literature
NPL 1: ISO/IEC 13818-2:2000, Information technology—Generic coding of moving pictures and associated audio information: Video NPL 2: Peter Symes, "Digital Video Compression," Mcgraw-Hill, 2003.

SUMMARY OF INVENTION

Technical Problem

According to the stream structure of MPEG-2, since a row of macroblocks is assembled into a structure called a slice, and processing which makes the macroblocks dependent on the scan order (for example, DPCM encoding of DC components) is carried out within slices, it is not possible to encode and rate control the shuffled macroblocks independently from one another. Hence, in the case of I-frame-only encoding compliant with MPEG-2, it is difficult to perform the rate control employing macroblock shuffling such as prescribed in the DV standard. In MPEG-2, since it is permitted to change a stream structure in such a manner that one macroblock may constitute one slice, macroblocks can be independently encoded and rate-controlled. However, if the stream structure is changed as thus, a problem occurs in that the predictive encoding such as DC prediction cannot be applied, overhead increases due to supplementary information, and, accordingly, the coding efficiency deteriorates.

In view of the above problems, it is therefore an object of the present invention to provide an image encoding apparatus, an image encoding method, and an image encoding program, which can homogenize the image quality of an image as a whole without lowering the encoding efficiency, being operable at high speed, and capable of reducing the size of the circuit scale by performing macroblock shuffling without changing the slice structure. More precisely, the rate control is guaranteed by firstly estimating the maximum possible rate, i.e., the corrected rate, for macroblocks whose predictive quantities are unknown and properly updating the rate of each of the macroblocks every time their predictive quantities become known. Further, the rate control which enables bits to be fairly allocated to each macroblock is realized by suitably correcting the allocated rate so that the deviation of the corrected rate from the expected rate, i.e., average rate is cancelled.

Solution to Problem

In accordance with a first aspect of the present invention, there is provided an image encoding apparatus for encoding image data indicative of an image, the apparatus comprising: a shuffling portion which collects and shuffles a plurality of macroblocks constituting the image data from respective positions within the image; an encoding portion which performs space-frequency transform and entropy encoding on the plurality of macroblocks collected and shuffled by the shuffling portion, as a base unit; and a rate control portion which controls the encoding portion to adjust, with the plurality of macroblocks as the base unit, a rate of the plurality of macroblocks after the encoding, wherein the rate control portion judges, for each macroblock of the plurality of macroblocks, whether a predictive quantity, to be predicted from a predictor macroblock of each macroblock, is known or not, and controls the encoding portion by performing rate correction, based on a number of macroblocks each judged as having a predictive quantity which is not known from among macroblocks which have already been encoded in the image data as a whole including the plurality of macroblocks.

With this configuration, the image encoding apparatus according to the present invention can realize the rate control employing the rate correction, since the image encoding apparatus can judge, for each macroblock of the plurality of macroblocks, whether a predictive quantity, to be predicted from the predictor macroblocks of each macroblock, is known or not while shuffling the macroblocks, and control the encoding portion by performing a rate correction, based on a number of macroblocks each judged as having a predictive quantity which is not known from among macroblocks which have already been encoded in the image data as a whole including the plurality of macroblocks. Further, by selecting a small number for the number of macroblocks which collectively constitute the base unit for performing processing, it is possible to make the processing operable at high speed, and to reduce the size of a circuit scale required for the processing. Moreover, since the encoding portion performs encoding on a small number of macroblocks taken from the pseudo-random positions in the image data by macroblock shuffling as the base unit, the image quality of the whole image can be homogenized, and the quality of the image can be improved. For example, even if a series of image data with large fluctuations in terms of image entropy is encoded into I-frames, since the size of the output stream can be homogenized, there is no possibility of breaking the constraint of the buffer. Hence, it is possible to simultaneously encode a plurality of frames with multiple threads and thereafter assemble into a stream. For the same reason, editing operation such as cut and insert is possible after the encoding.

Moreover, in the above-mentioned image encoding apparatus, an encoded macroblock whose predictive quantity, to be predicted from an associated predictor macroblock, is not known is defined as an open macroblock, and the rate control portion may calculate an allocated rate of the plurality of macroblocks by multiplying the allocated rate of the image data by a value obtained by dividing a number of macroblocks in the plurality of macroblocks by a number of macroblocks in the image data, calculate a correction to the allocated rate of the plurality of macroblocks by multiplying a difference between a number of the open macroblocks in the image data as a whole before and after the plurality of macroblocks are encoded by the encoding portion by a difference between a maximum rate of a predictive code of the open macroblock and an average rate of the predictive code, calculate a corrected, allocated rate by adding the correction to the allocated rate of the plurality of macroblocks, and control the encoding portion so that the rate after the encoding of the plurality of macroblocks is equal to or less than the corrected, allocated rate.

With this configuration, in the image encoding apparatus according to the present invention, the rate control portion can calculate the allocated rate of the plurality of macroblocks by multiplying the allocated rate of the image data by a value obtained by dividing a number of macroblocks in the plurality of macroblocks by a number of macroblocks in the image data, calculate a correction to the allocated rate of the plurality of macroblocks by multiplying a difference between a number of the open macroblocks in the image data as a whole before and after the plurality of macroblocks are encoded by the encoding portion by a difference between a maximum rate of a predictive code of the open macroblock and an average rate of the predictive code, calculate a corrected, allocated rate by adding the correction to the allocated rate of the plurality of macroblocks, and control the encoding portion so that the rate after the encoding of the plurality of macroblocks is equal to or less than the corrected, allocated rate. Therefore, when encoding, since the rate of an open macroblock is updated as appropriate each time the rate of the predictive code becomes known after the maximum possible rate is allocated once to the open macroblock, the predictive quantities of which are unknown, the rate control can be guaranteed. Moreover, since the allocated rate is corrected as appropriate, the rate of the predictive code can be allocated fairly and stably.

Moreover, in the above-mentioned image encoding apparatus, the plurality of macroblocks may be encoded by the encoding portion conforming to at least one of JPEG and MPEG-2. More specifically, the above can be applied to a still image. In the image encoding apparatus according to the present invention, even if a series of image data with large fluctuations in terms of image entropy, for example, is encoded with only I-frames the size of the output bit streams can be substantially homogenized, and it is possible to encode the plurality of frames at the same time using multiple threads, and then assemble them into a stream. In addition, for the same reason, editing such as cut and insert after encoding is easy. Furthermore, since the encoding portion may encode the plurality of macroblocks conforming to the inter-frame coding method, the invention can be applied to a wide variety of applications.

In the above-mentioned image encoding apparatus, the predictive code may include a code of DC prediction, for example. With this configuration, in the image encoding apparatus according to the present invention, when encoding, since the rate can be updated as appropriate each time the rate of the predictive code becomes known after the maximum possible rate is allocated once to an open macroblock for which the DC prediction is unknown, the rate control can be guaranteed. The space-frequency transform may be executed by the DCT transform, and the rate control portion may determine a quantization scale used when the plurality of macroblocks are quantized by the encoding portion, on the basis of the corrected, allocated rate. For example, the rate allocated to AC components, which is likely to be sacrificed in the DC prediction, can be stably ensured, and two-dimensional fine changes can be clearly depicted.

In the above-mentioned image encoding apparatus, the image data may include a slice layer constituted by a second plurality of macroblocks aligned in a single row, the shuffling portion may create position information of the second plurality of macroblocks including scan order in the slice layer when the second plurality of macroblocks are shuffled, and the rate control portion may calculate a rate of a macroblock of the second plurality of macroblocks aligned in a single row constituting the slice layer in terms of bytes by subtracting a value obtained by dividing a bitwise total rate of encoded macroblocks and overhead associated therewith in the second plurality of macroblocks aligned in a single row constituting the slice layer by 8, and rounding thus obtained quotient up to an integer, from a value obtained by dividing a sum of a bitwise rate of the macroblock of the second plurality of macroblocks aligned in the single row constituting the slice layer and the bitwise total rate of the encoded macroblocks and overhead associated therewith in the second plurality of macroblocks aligned in the single row constituting the slice layer by 8, and rounding thus obtained quotient up to an integer.

Codes of the macroblocks in a slice are usually processed by the unit of byte. With this configuration, in the image encoding apparatus according to the present invention, since the rate control portion can calculate the rate in terms of bytes of a macroblock by subtracting a value obtained by dividing a bitwise total rate of the encoded macroblocks and the overhead associated therewith in the plurality of macroblocks arrayed in a single row constituting the slice layer by 8, and rounding it up to an integer from a value obtained by dividing the sum of the bitwise rate of that macroblock and the bitwise total rate of the encoded macroblocks and the overhead associated therewith in the plurality of macroblocks arrayed in a single row constituting the slice layer by 8 and rounding it up to an integer, the rate of each macroblock in a slice layer can be estimated conservatively, giving consideration to a fraction of bits.

The above-mentioned image encoding apparatus may further include an intermediate buffer portion for temporarily storing coded data encoded by the encoding portion; and a reordering portion for reordering the coded data to be aligned in an order before being shuffled by the shuffling portion by reading, in scan order, the coded data stored in the intermediate buffer portion, and outputting the coded data, wherein the intermediate buffer portion may have a capacity equivalent to the sum of an allocated rate of the image data as a whole and a value obtained by multiplying a fixed-length overhead by a total number of the macroblocks.

With the prior-art buffer for storing codes of the macroblocks for each macroblock, the maximum rate of a macroblock is allocated to each macroblock buffer; however, in the image encoding apparatus according to the present invention, the required buffer capacity can be reduced to the sum of an allocated rate of the image data as a whole and a value obtained by multiplying a fixed-length overhead by a total number of the macroblocks.

In accordance with a second aspect of the present invention, there is provided an image encoding method for encoding image data indicative of an image, the method comprising: a shuffling step of collecting and shuffling a plurality of macroblocks constituting the image data from respective positions within the image; an encoding step of performing space-frequency transform and entropy encoding on the plurality of macroblocks collected and shuffled in the shuffling step, as a base unit; and a rate control step of controlling the encoding step to adjust, with the plurality of macroblocks as the base unit, a rate of the plurality of macroblocks after the encoding, wherein the rate control step has a step of judging, for each macroblock of the plurality of macroblocks, whether a predictive quantity, to be predicted from a predictor macroblock of each macroblock, is known or not, and a step of controlling the encoding step by performing rate correction, based on a number of macroblocks each judged as having a predictive quantity which is not known from among macroblocks which have already been encoded in the image data as a whole including the plurality of macroblocks.

In accordance with a third aspect of the present invention, there is provided an image encoding program executable by a computer for encoding image data indicative of an image, the program comprising: a shuffling step of collecting and shuffling a plurality of macroblocks constituting the image data from respective positions within the image; an encoding step of performing space-frequency transform and entropy encoding on the plurality of macroblocks collected and shuffled in the shuffling step, as a base unit; and a rate control step of controlling the encoding step to adjust, with the plurality of macroblocks as the base unit, a rate of the plurality of macroblocks after the encoding, wherein the control step has a step of judging, for each macroblock of the plurality of macroblocks, whether a predictive quantity, to be predicted from a predictor macroblock, of each macroblock is known or not, and controlling the encoding step by performing rate correction, based on a number of macroblocks each judged as having a predictive quantity which is not known from among macroblocks which have already been encoded in the image data as a whole including the plurality of macroblocks.

It is possible to realize the rate control employing the rate correction, since it is judged whether the predictive quantity, to be predicted from the predictor macroblock of each macroblock, is known or not while shuffling the macroblocks, and the encoding step is controlled by performing a rate correction, based on a number of macroblocks each judged as having a predictive quantity which is not known from among macroblocks which have already been encoded in the image data as a whole including the plurality of macroblocks. Further, by selecting a small number for the number of macroblocks which collectively constitute the base unit for performing processing, it is possible to make the processing operable at high speed, and to reduce the size of a circuit scale required for the processing. Moreover, since the encoding step performs encoding on macroblocks taken from pseudo-random position in the image data by macroblock shuffling, with the plurality of macroblocks as the base unit, the image quality of the whole image can be homogenized, and the quality of the image can be improved. For example, even if a series of image data with large fluctuations in terms of entropy is encoded with only I-frames, since the size of the output stream can be homogenized, there is no possibility of breaking the constraint of a buffer. Hence, it is possible to simultaneously encode a plurality of frames with multiple threads and thereafter assemble into a stream. For the same reason, editing operation such as cut and insert is possible after the encoding.

Advantageous Effects of Invention

Since, by executing the macroblock shuffling, macroblocks are extracted in a pseudo-random manner, and the encoding is controlled with a small number of macroblocks called a segment as a unit, a high-speed rate control can be realized and the size of the required circuit scale can be reduced while homogenizing the image quality, and accordingly, improving the quality of the image. Since the slice structure is not changed, the predictive encoding can be applied and the encoding efficiency is not lowered. The rate control can be guaranteed by firstly estimating the maximum possible rate, i.e., the corrected rate, for macroblocks the predictive quantities predicted from the predictor macroblocks of which are unknown and properly updating the rate of each of the macroblocks every time when the prediction becomes known. Further, bits can be fairly allocated to each macroblock by suitably correcting the allocated rate so that the deviation of the corrected rate from the expected rate, i.e., average rate e is cancelled.

DESCRIPTION OF EMBODIMENTS

Preferred embodiments of the present invention will be described below with reference to the accompanying drawings.

First Embodiment

Figure 1:
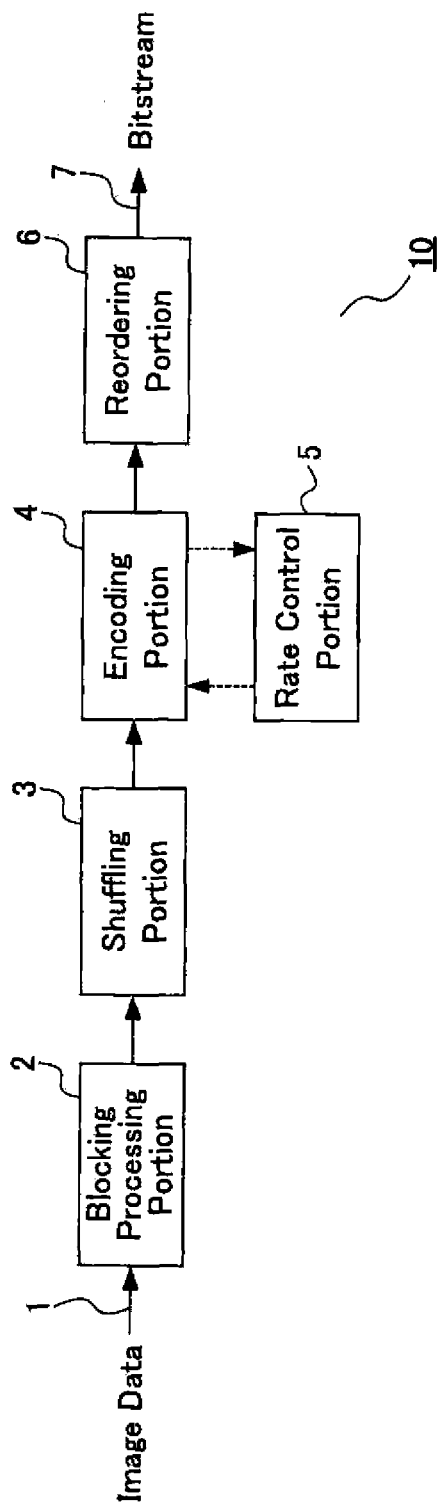
FIG. 1 is a block diagram illustrating a first embodiment of an image encoding apparatus according to the present invention.

A first embodiment of an image encoding apparatus according to the present invention will be described referring to FIG. 1. As shown in FIG. 1, the present embodiment of the image encoding apparatus 10 is provided with an input portion 1 for inputting digitized image data, a blocking processing portion 2, a shuffling portion 3, an encoding portion 4, a rate control portion 5, a reordering portion 6, and an output portion 7. The blocking processing portion 2 partitions the image data input from the input portion 1 into blocks so as to create macroblocks, which are base units of encoding. The shuffling portion 3 extracts the macroblocks created by the blocking processing portion 2 in a pseudo-random manner. The plurality of macroblocks extracted in a pseudo-random manner by the shuffling portion 3 is collectively called a segment. The number of macroblocks constituting a segment may be a small number, say 5. The encoding portion 4 applies the DCT transform, quantization, and variable-length encoding on the macroblocks shuffled and extracted in a pseudo-random manner by the shuffling portion 3 so as to create a bitstream. The rate control portion 5 performs rate control by the unit of segment for the shuffled macroblocks. Details of the shuffling executed by the shuffling portion 3 and the rate control executed by the rate control portion 5 will be described later. The reordering portion 6 reorders the bitstream created by the encoding portion 4 to an order before shuffling by the shuffling portion 3, and outputs the bitstream through the output portion 7. Since the present embodiment of the image encoding apparatus extracts the macroblocks from pseudo-random positions on the image by shuffling, the image quality of the image as a whole can be homogenized. In addition, since the number of macroblocks included in the segment can be small, the rate control can be performed at a high speed, and a required circuit scale can be made small.

1. Specific Shuffling Method

Figure 2:
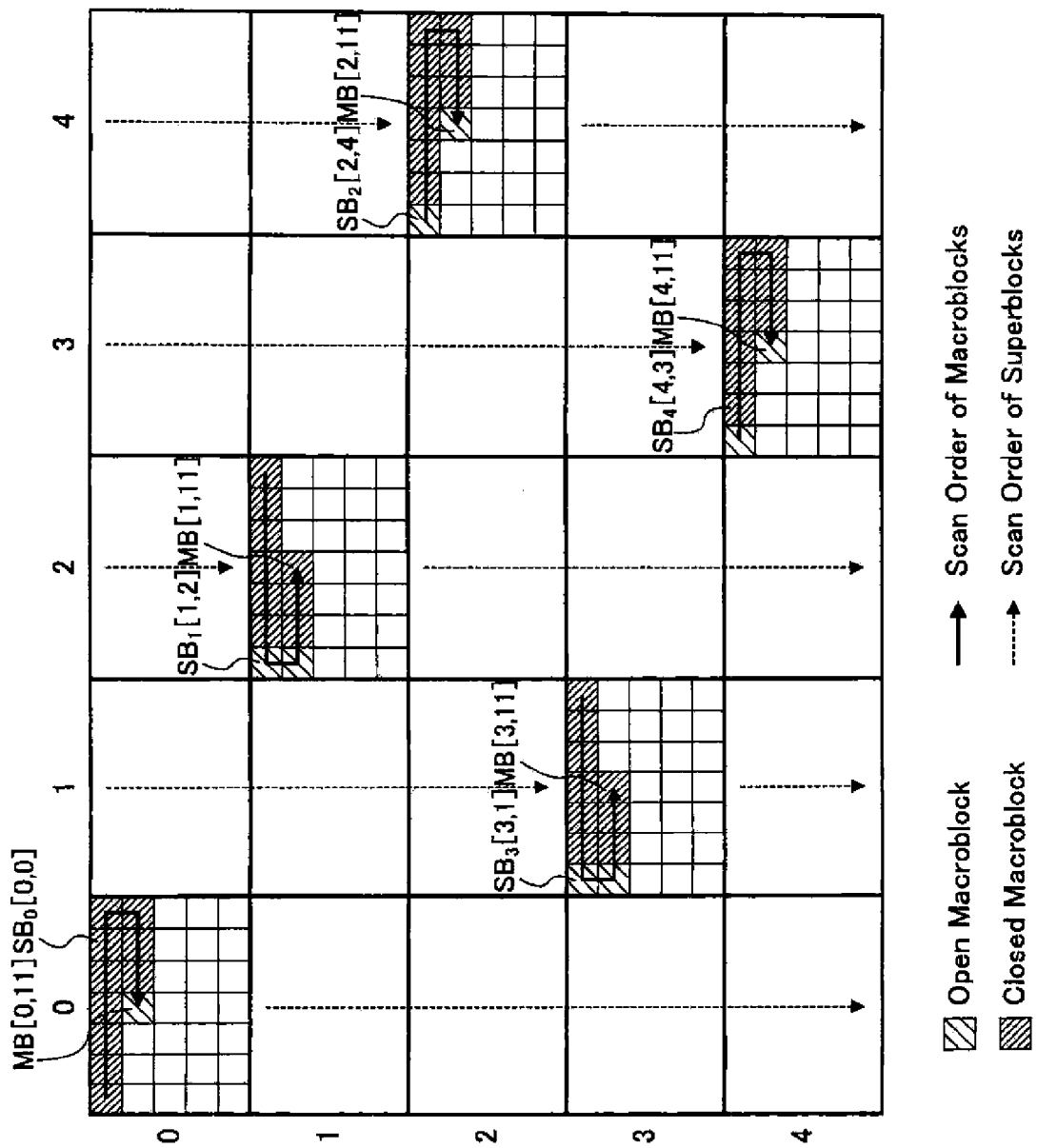
FIG. 2 is a diagram illustrating shuffling carried out by a shuffling portion of the image encoding apparatus shown in FIG. 1.
Figure 3:
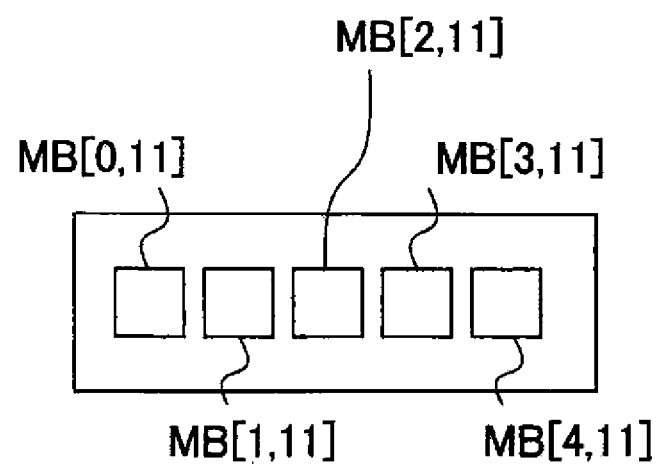
FIG. 3 is a diagram showing an example of a segment formed by the shuffling shown in FIG. 2.

A specific shuffling method executed by the shuffling portion 3 will be described below referring to FIG. 2. FIG. 2 illustrates image data partitioned into blocks including the macroblocks for which the shuffling portion 3 executes shuffling, and FIG. 3 illustrate a segment including the macroblocks extracted in a pseudo-random manner from the image data. In the present embodiment, a description will be provided by supposing image data includes macroblocks in 35 columns by 25 rows.

First, the entire image data is divided into superblocks having macroblocks in 7 columns and 5 rows. In FIG. 2, the superblocks are indicated by a rectangle with thick lines. In the present embodiment, five superblocks $SB_0$ to $SB_4$ are selected so that no macroblocks share at least either of the same column or row. A dashed arrow indicates the scan order of the superblocks. Supposing that the superblock at the i-th row and the j-th column located at the k-th number from the above is $SB_K[i, j]$, $SB_0[0, 0]$, $SB_1[1, 2]$, $SB_2[2, 4]$, $SB_3[3, 1]$, $SB_4[4, 3]$ are selected in FIG. 2.

Subsequently, the selected superblocks are scanned, one macroblock is extracted from each of the selected superblocks, and a segment is formed. In FIG. 2, the macroblock is indicated by a square with thin lines, and a solid arrow indicates the scan order of the macroblocks. Supposing that the l-th macroblock scanned in the k-th superblock is MB[k, l], an example of the formed segment is shown in FIG. 3. The segment shown in FIG. 3 is formed by the 11-th macroblocks MB[0, 11], MB[1, 11], MB[2, 11], MB[3, 11], MB[4, 11], extracted from the respective superblocks.

After all the macroblocks in the given superblocks are processed in the order shown by the solid arrows in FIG. 2, as shown by the scan order of superblocks indicated by the dashed arrows, the unprocessed superblocks located below the respective processed superblocks are selected, the macroblocks are selected from the respective unprocessed superblocks in a predetermined order, and the subsequent segments are formed. If all the macroblocks in a superblock located at the bottom are processed, the unprocessed superblock at the top of the same column as the processed superblock is selected next. Similar processing is performed in all the superblocks. Although segment macroblocks can be selected in such a manner that one unprocessed macroblock is selected from each of the selected superblock in an order of zigzag scanning inside the respective superblock as shown by the solid arrows in FIG. 2, for example, it is not limited thereto, and the selection may be made in any order as long as the predetermined number of macroblocks belonging to the segment can be selected timely without missing in a spatially pseudo-random manner from the image data. In addition, the number of extracted macroblocks is not limited to five, and may be an arbitrary number or may be variable, if it is suitable for a system to be implemented. Such a shuffling pattern may be stored in advance in memory (not shown) as a table so that the shuffling portion 3 can execute shuffling while referring to the table stored in the memory. The encoding portion 4 and the rate control portion 5 execute the encoding processing and the rate control for each segment formed as above, respectively.

In FIG. 2, the shaded macroblocks indicate encoded macroblocks. Pale shading indicates an encoded macroblock whose predictor macroblock regarding the DC predictions has not been encoded yet, while dense shading indicates an encoded macroblock whose predictor macroblock regarding the DC predictions has been already encoded. Hereinafter, the encoded macroblock whose predictor macroblock regarding the DC predictions has not been encoded yet is referred to as "an open macroblock", while the encoded macroblock whose predictor macroblock regarding the DC predictions has been already encoded is referred to as "a closed macroblock". A slice layer is constituted by a row of the macroblocks in the horizontal direction in FIG. 2. Since the left most macroblock is the macroblock located at the beginning of the slice, it is always processed as a closed macroblock. According to MPEG-2, since a row of macroblocks constitutes a slice, the DC predictions may be made across superblocks. The shuffling portion 3 creates position information of the macroblocks including the scan order in the slice layer when the macroblocks are shuffled.

When the shuffling is performed as shown in FIG. 2, although the number of open macroblocks tends to increase as the encoding progresses till the number of encoded macroblocks reaches a certain number, for example, substantially the half of the number of all the macroblocks, if the number of the encoded macroblocks further increases, exceeding the certain number, the number of open macroblocks tends to decrease. The number of macroblocks may be different from one segment to another according to the image data size or a method of division into superblocks. In this case, the rate to be allocated to one segment may be changed so that the rate per macroblock inside the segment becomes equal. In the present embodiment, the number of the macroblocks in one segment is supposed to be always the same in order to simplify the explanation.

2. Encoding Method of Macroblock

The encoding method of the macroblocks in an I-frame performed by the encoding portion 4 in conformance to MPEG-2 will be described below. Although the number of DCT blocks constituting one macroblock is different depending on chroma sub-sampling, the chroma subsampling is assumed to be 4:2:2 for ease of the explanation. If the chroma subsampling is 4:2:2, the macroblock is constituted by four luminance (Y) blocks and two chrominance (Cb, Cr) blocks for each of Cb and Cr. Each of the blocks is DCT transformed. The DCT components of a DCT block are divided into one DC component and the remaining AC components, to which different encoding processes are applied, respectively.

The AC components are quantized by a quantization matrix with different accuracy depending on the frequency. Thereafter, the matrix-quantized AC components are further quantized by a quantization scale common to all the AC components. The AC components quantized by the quantization scale is zigzag-scanned and entropy-encoded. The encoding portion 4 performs the rate control by changing the quantization scale to the AC components.

Figure 4:
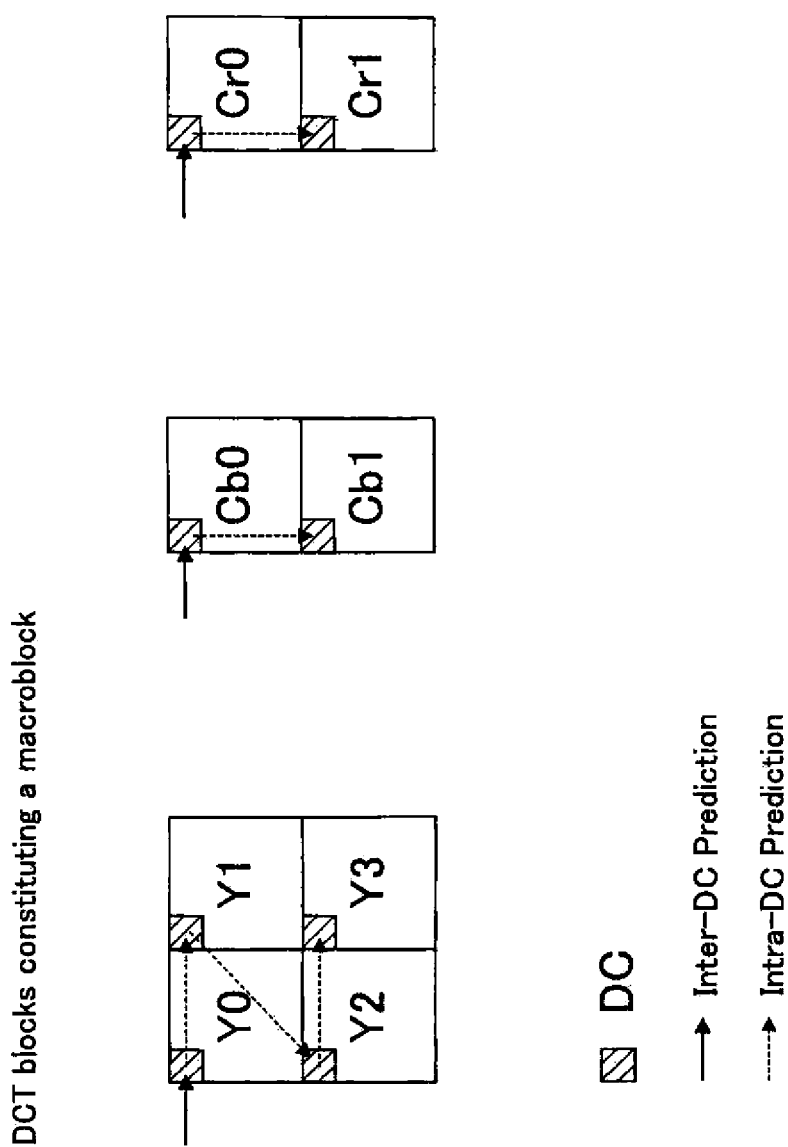
FIG. 4 is a diagram illustrating an encoding process carried out by the image encoding apparatus shown in FIG. 1.

The DC component is quantized to 11, 10, 9 or 8 bits, and then predictive encoded for Y, Cb, and Cr. That is, a DC component of a given block is used as a predicted value for the DC component of the subsequent block, and the difference is encoded. FIG. 4 shows DCT blocks of Y indicating a luminance signal and DCT blocks of Cb and Cr indicating chrominance signals, each of which has a DC component. As shown in FIG. 4, the four Y blocks are called Y0, Y1, Y2, and Y3 in the scan order, and are DC-predicted in this order. The two Cb blocks are also called Cb0 and Cb1 in the scan order, and are DC-predicted in this order. The two Cr blocks are similarly called Cr0 and Cr1 in the scan order, and are DC-predicted in this order. The first blocks Y0, Cb0, and Cr0 in a macroblock, referred to as a "predictee macroblock", are predicted from Y3, Cb1, and Cr1 of its previous macroblock, referred as a "predictor macroblock", which is immediately before the predictee macroblock in the scan order. In the description below, intra-macroblock DC predictions in the macroblock is called "intra-DC predictions" and inter-macroblock DC predictions between the macroblocks as "inter-DC predictions".

The inter-DC predictions are performed only between the macroblocks included in the same slice. In order to facilitate the understanding, the description below is directed to a case where the slice is the largest. That is, the macroblocks in the same row are assumed to belong to the same slice. Since the macroblock at the beginning of the slice, or the left-most macroblock in the row, has no predictor macroblock, the DCs are predicted from zero.

3. Specific Budget Allocation Method

Allocation of code budget to each segment, and a correction method thereof considered when the rate control portion 5 performs the rate control, will be described below using a case of simplified encoding of the I-frame conforming to MPEG-2. The budget allocation method of the present embodiment is based on the following characteristics. 1. Rate control can be guaranteed. More specifically, since a stream no more than an intended code length is output all the time regardless of the complexity of image data, rate control will not fail. 2. The budget can be allocated fairly to the macroblocks. On average, an allocated rate of each macroblock, i.e. a budget, can be substantially the same between the segments whether the macroblock is open or closed. It should be noted that the term "code budget", or "budget" herein used is intended to mean a "maximum allocatable rate" or merely an "allocatable rate".

In the present embodiment, in order to simplify the description, a compression method in which the MPEG-2 compliant I-frame is simplified as bellow is applied. (1) It is assumed that there is no overhead due to headers of MPEG-2 (a sequence header, a picture header, a slice header, a macroblock header, for example). It is also assumed that the final encoded stream is constituted only by codes of the macroblocks, and the codes of the macroblocks are constituted only by DC (intra, inter) and AC codes. (2) Dependencies other than the inter-DC prediction (quantization scale, bit alignment of codes, overhead of the first macroblock of a slice, for example) are not considered. The simplification in (1) is realized by subtracting the fixed-length overhead from the budget of the image data as a whole in advance. The simplification in (2) will be examined later so as to show that this method can be easily extended to MPEG-2 compliant I-frame.

When the budget for the final stream size, that is, the rate of the image data as a whole, is given by $B_{picture}$, the budget for the rate of a segment, $B_{segment}$, can be calculated according to the following equation.

$$B_{segment} = \left\lfloor \frac{N_{MBs\ in\ segment}}{N_{MBs\ in\ picture}} B_{picture} \right\rfloor \qquad \text{[Math. 1]}$$

where $N_{MBs\ in\ picture}$ and $N_{MBs\ in\ segment}$ indicate the number of macroblocks included in the image data as a whole and the number of macroblocks included in the segment, respectively. In the above equation, in the case that $$(N_{MBs\ in\ segment}/N_{MBs\ in\ picture})B_{picture} \qquad \text{[Math. 2]}$$

is not an integer, in order to guarantee the rate control, a truncated value becomes the budget of the segment. In the case of truncation, in order not to waste the remaining budged, the remaining budget may be allocated to some segments.

When a given segment is rate-controlled by the rate control portion 5, by changing a quantization parameter used in the quantization processing executed by the encoding portion 4, the actual rate of that segment, $S_{segment}$, or the corrected rate, $S'_{segment}$, as will be described below, is controlled so as to be equal to or less than the budget allocated to the segment, $B_{segment}$, or the corrected budget, $B'_{segment}$, as will be described below. After encoding of a given segment, the remaining budget ($B'_{segment} - S'_{segment}$) may be allocated to the subsequent segments.

The number of open macroblocks is changed as encoding of the segment progresses. If the number of open macroblocks at a given point of time is expressed as $N_{open\ MBs}$, $N_{open\ MBs} = 0$ before encoding is started. Each time the given segment is encoded, $N_{open\ MBs}$ is increased, decreased or not changed. When all the macroblocks in the image data have been encoded, $N_{open\ MBs} = 0$.

The change in the number of open macroblocks after encoding of a given segment,
$\Delta N_{open\ MBs}$
is defined by the following equation.

$$\Delta N_{open\ MBs} = N'_{open\ MBs} - N_{open\ MBs} \qquad \text{[Math. 3]}$$

where $N_{open\ MBs}$ and $N'_{open\ MBs}$ represent the numbers of open macroblocks before and after encoding of the segment, respectively. Since the number of macroblocks belonging to the segment is $N_{MBs\ in\ segment}$, the following holds.

$$-N_{MBs\ in\ segment} \leq \Delta N_{open\ MBs} \leq N_{MBs\ in\ segment} \qquad \text{[Math. 4]}$$

The corrected budget allocated to the segment, $B'_{segment}$, is defined by the following equation using
$\Delta N_{open\ MBs}$ $$B'_{segment} = B_{segment} + \text{avg}[O_{open\ MB}] \Delta N_{open\ MBs} \qquad \text{[Math. 5]}$$

where,
$\text{avg}[O_{open\ MB}]$
represents the average rate of the overhead of an open macroblock. For a given macroblock, the rate of the overhead of an open macroblock, $O_{open\ MB}$, is defined by the following equation as a difference between the maximum rate of the inter DC-predictions, $\max[S_{inter\ DC\ pred.}]$, and the rate of the actual inter DC-predictions, $S_{inter\ DC\ pred.}$.

$$O_{open\ MB} = \max[S_{inter\ DC\ pred.}] - S_{inter\ DC\ pred.} \qquad \text{[Math. 6]}$$

$\text{avg}[O_{open\ MB}]$ can be expressed as follows using an average rate of the inter DC-predictions, $\text{avg}[S_{inter\ DC\ pred.}]$.

$$\text{avg}[O_{open\ MB}] = \max[S_{inter\ DC\ pred.}] - \text{avg}[S_{inter\ DC\ pred.}] \qquad \text{[Math. 7]}$$

The average rate may be estimated statically by calculating an average value of typical image data or dynamically from the image data being encoded. In the following, in order to simplify the explanation, it is assumed that the average rate is static.

Since adding
$\Delta N_{open\ MBs}$
for all the segments results in 0, the sum of the budgets after correction, $B'_{segment}$, for all the segments is equal to the sum of the budgets before correction, $B_{segment}$, for all the segments. That is, even if the budget for the segment, $B_{segment}$, is corrected to $B'_{segment}$, the budget for the image data as a whole is not changed.

In order to guarantee the rate control of the image data as a whole, it is only necessary that the segment-wise rate control can be guaranteed. In order to guarantee the segment-wise rate control, the rate control portion 5 should be able to perform rate control so that the rate of the segment becomes $B'_{segment}$ or less even in the worst case. $B'_{segment}$ becomes the minimum value $\min[B'_{segment}]$ when $\Delta N_{open\ MBs}$ becomes the minimum value ($-N_{open\ MBs\ in\ segment}$) as follows.

$$\min[B'_{segment}] = B_{segment} - \text{avg}[O_{open\ MB}] \Delta N_{MBs\ in\ segment} \quad [\text{Math. 8}]$$

The minimum rate required to encode a segment can be calculated as the maximum value of $S'_{AC\text{-}dropped\ segment}$, $\max[S'_{AC\text{-}dropped\ segment}]$, where $S'_{AC\text{-}dropped\ segment}$ is the corrected rate of the segment when all the AC components in the macroblocks belonging to the segment are set to zero. For example, $\max[S'_{AC\text{-}dropped\ segment}]$ can be statically calculated if the I-frame is compliant with one of MPEG-2 or the like. By using the above constraint, a condition to guarantee the rate control of the segment can be expressed as follows.

$$\min[B'_{segment}] \geq \max[S'_{AC\text{-}dropped\ segment}] \quad [\text{Math. 9}]$$

$\max[S_{AC\text{-}dropped\ segment}]$ can be made smaller by setting the residuals of the intra DC predictions in the macroblock to zero (that is, using the same DC in the macroblock) or the like. In the following description, this condition is assumed to be satisfied in order to guarantee the rate control.

The corrected rate of a given segment, $S'_{segment}$, is defined as a value obtained by subtracting the sum of the open macroblock overhead $O_{open\ MB}$ for all the macroblocks newly found to be closed by encoding that segment from a value obtained by adding the sum of the rate of the closed macroblock $S_{MB}$ for all the closed macroblocks belonging to the segment and the sum of the corrected rate of the open macroblock $S'_{MB}$ for all the open macroblocks belonging to the segment. Therefore, it can be expressed by the following equation.

$$S'_{segment} = \sum_{\text{For all closed MBs in the segment}} S_{MB} + \sum_{\text{For all open MBs in the segment}} S'_{MB} - \sum_{\text{For all newly closed MBs by encoding the segment}} O_{open\ MB} \quad [\text{Math. 10}]$$

where the open macroblock overhead $O_{open\ MB}$ is a difference, as defined above, between the maximum rate of the inter DC predictions, $\max[S_{inter\ DC\ pred.}]$, and the actual rate of the inter DC predictions, $S_{inter\ DC\ pred.}$ (described again).

$$O_{open\ MB} = \max[S_{inter\ DC\ pred.}] - S_{inter\ DC\ pred.} \quad [\text{Math. 11}]$$

The rate of the closed macroblock, $S_{MB}$, is obtained by adding the rate of the inter DC predictions, $S_{inter\ DC\ pred.}$, the rate of the intra DC predictions, $S_{intra\ DC\ pred.}$, and the rate of the AC components, $S_{AC}$, together, as shown in the following expression.

$$S_{MB} = S_{inter\ DC\ pred.} + S_{intra\ DC\ pred.} + S_{AC} \quad [\text{Math. 12}]$$

On the other hand, the corrected rate of the open macroblock, $S'_{MB}$, is obtained by adding the maximum rate of the inter DC predictions, $\max[S_{inter\ DC\ pred.}]$, the rate of the intra DC predictions, $S_{intra\ DC\ pred.}$, and the rate of the AC components, $S_{AC}$, together, as shown in the following equation.

$$S'_{MB} = \max[S_{inter\ DC\ pred.}] + S_{intra\ DC\ pred.} + S_{AC} \quad [\text{Math. 13}]$$

The corrected rate of the open macroblock, $S'_{MB}$, is expressed as follows by using the actual rate of the inter DC predictions, $S_{inter\ DC\ pred.}$, which becomes known when the macroblock is closed in the future.

$$S'_{MB} = (\max[S_{inter\ DC\ pred.}] - S_{inter\ DC\ pred.}) + \quad [\text{Math. 14}]$$
$$(S_{inter\ DC\ pred.} + S_{intra\ DC\ pred.} + S_{AC})$$
$$= O_{open\ MB} + S_{MB}$$

Thus, it is clear that the open macroblock overhead $O_{open\ MB}$ of $\Delta N_{open\ MBs}$ open macroblocks are added to this segment. These open macroblock overheads can be approximated by $\text{avg}[O_{open\ MB}]$ on average. Thus, by correcting the budged for the segment by adding $\text{avg}[O_{open\ MB}] \Delta N_{open\ MBs}$ to the budget, the overhead can be cancelled, and allocation of the budget among the segments can be made fair.

By using an averagely estimated rate instead of the corrected rate $S'_{MB}$ as the rate of an open macroblock so as not to correct the budget for the segment, the allocation of the budget among the segments can also be made fair. However, if the above method is employed, the rate control cannot be guaranteed. That is because, when the rate of the inter DC predictions is found later, the rate might become larger than the average rate, and in that case, the difference might become larger than the outstanding budget.

When, even if the maximum, that is, the coarsest, quantization parameter is used, the corrected rate of the segment, $S'_{segment}$, becomes larger than the corrected budget of that segment, $B'_{segment}$, the rate is made smaller as follows, for example, so as to guarantee the rate control. If all the ACs are brought to zero, the corrected rate at that time becomes $S'_{AC\text{-}dropped\ segment}$, which is surely smaller than $B'_{segment}$. That is because the following relation holds true.

$$B'_{segment} \geq \min[B'_{segment}] \geq \max[S'_{AC\text{-}dropped\ segment}] = S'_{AC\text{-}dropped\ segment} \quad [\text{Math. 15}]$$

4. Rate Control Using Corrected Budget

Figure 5:
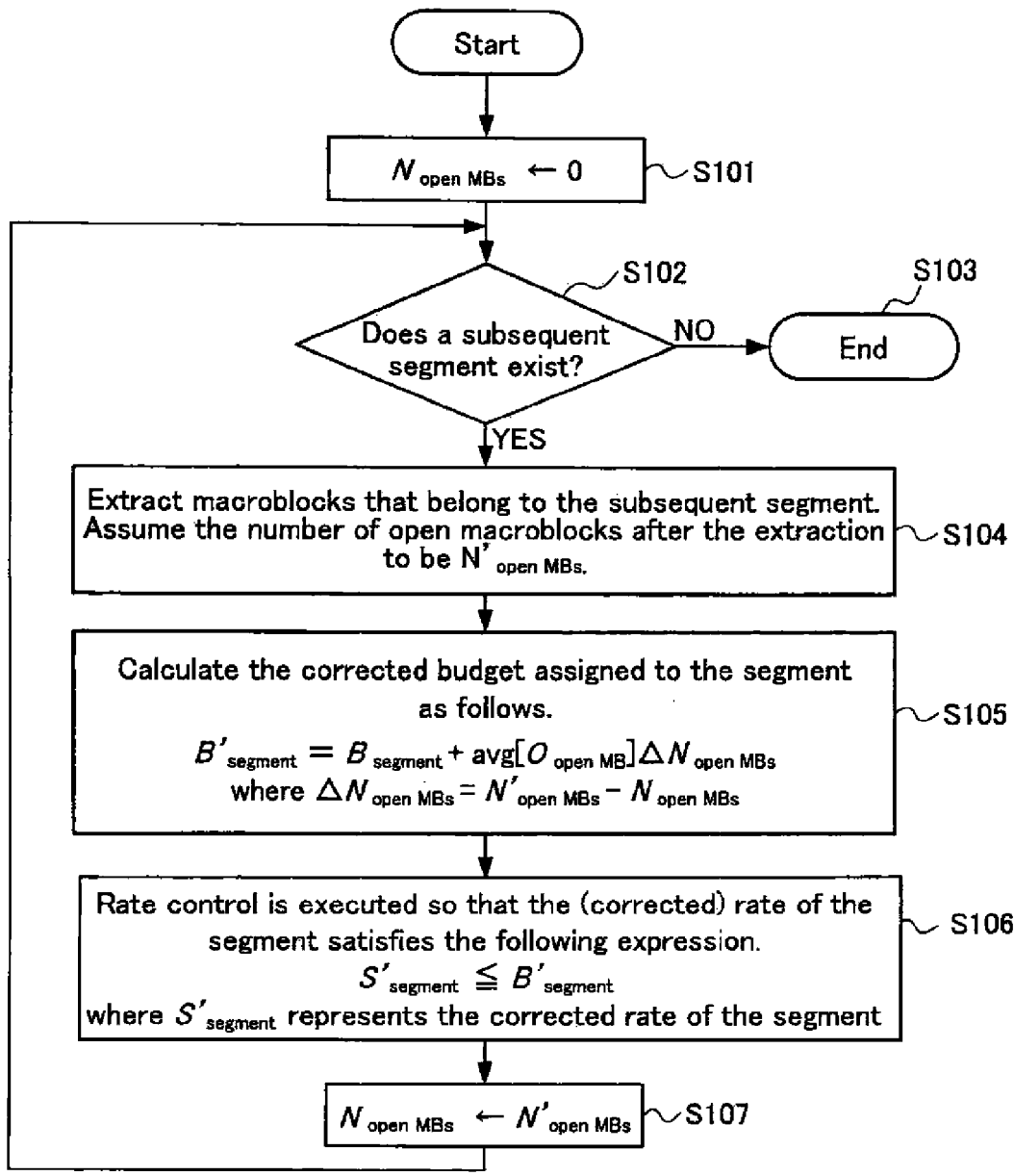
FIG. 5 is a flow diagram illustrating a rate control process carried out by a rate control portion of the image encoding apparatus shown in FIG. 1.

The rate control using the budget corrected as above, executed by the rate control portion 5 will be described with reference to a flowchart shown in FIG. 5.

First, in Step S101, the number of open macroblocks, $N_{open\ MBs}$, is set to 0. In Step S102, it is determined if the subsequent segment exists or not. If it is determined that there is no subsequent segment, the processing advances to Step S103, and is finished. On the other hand, if it is determined that the subsequent segment exists, the routine goes to Step S104. At Step S104, the macroblocks belonging to the subsequent segment are encoded. The numbers of the open macroblocks before and after the macroblocks are encoded are $N_{open\ MBs}$, $N'_{open\ MBs}$, respectively. At Step 105, the budget to be allocated to this segment is corrected according to the following equation:

$$B'_{segment} = B_{segment} + \text{avg}[O_{open\ MB}] \Delta N_{open\ MBs} \quad [\text{Math. 16}]$$

where $$\Delta N_{open\ MBs} = N'_{open\ MBs} - N_{open\ MBs} \quad [\text{Math. 17}]$$

In Step S106, this segment is rate-controlled so that the corrected rate of the segment, $S'_{segment}$, meets the following equation.

$$S'_{segment} \leq B'_{segment} \quad [\text{Math. 18}]$$

In Step S107, the number of open macroblocks $N_{open\ MBs}$ is replaced by $N'_{open\ MBs}$. Then, returning to Step S102, similar processing is repeated as long as the subsequent segment exists.

As mentioned above, since the present embodiment of the image encoding apparatus 10 can update the rate as appropriate for the open macroblock, the predictive quantities of which are unknown, each time the rate of the prediction becomes known after the maximum possible rate is allocated once during encoding, a failure of rate control can be avoided, and since the allocated rate is corrected as appropriate, the rate of predictive code can be allocated fairly and stably. In addition, by applying the present invention to the DC prediction so as to allocate the rate to the DC prediction fairly and stably, for example, the rate to be allocated to the AC components, for example, which is likely to be sacrificed in the DC prediction, can be ensured stably, and a two-dimensional fine change can be clearly expressed. Furthermore, the present invention can be applied not only to the DC prediction, but also to various predictions such as AC prediction, for example.

It may be so configured that the space-frequency transform is executed by the DCT transform, and the rate control portion determines the quantization scales used by the encoding portion when a plurality of macroblocks are quantized on the basis of a corrected, allocated rate. Alternatively, as an alternative mode according to the present invention, it can also be conceived that only the DC components of the macroblocks of the image data as a whole are acquired first, the rate relating to the DC prediction is calculated in advance, and then, the rate control is performed for the AC components through the macroblock shuffling.

Moreover, since the macroblocks are extracted in a pseudo-random manner by executing the macroblock shuffling and encoding is controlled by the unit of a small number of macroblocks as the segment, the rate control can be performed at high speed, while the quality of the image as a whole is maintained homogenous, and a required circuit scale can be made small.

As described above, the present embodiment of the image encoding apparatus 10 can perform rate correction in which the rate of an open macroblock is estimated to be the maximum possible rate and updated successively without changing the slice structure, while the quality of the image as a whole is maintained homogenous by macroblock shuffling so that the rate control can be executed at high speed and the required circuit scale can be made small.

5. Dependencies Other than Inter-DC Prediction

The dependencies other than the inter DC prediction, considered when the rate control portion 5 performs the rate control, such as the quantization scale, the bit alignment of codes, and the overhead of the first macroblock in a slice, will be examined below.

(1) Quantization Scale

The quantization scale of a given macroblock can be omitted if it is the same as the quantization scale of the predictor macroblock of that macroblock. More specifically, in MPEG-2, whether the quantization scale has been changed or not is notified by a flag of the header of the macroblock. For an open macroblock, the quantization scale of the predictor macroblock of which is unknown, a corrected rate needs to be calculated using the maximum possible rate. By correcting the allocated rate, that is, the budget also for the quantization scale using a method similar to correction of the inter DC predictions, the allocation of the budgets among the segments can be made fair.

(2) Bit Alignment of Codes

In the above, the description is provided assuming that the rates of the DC components and the AC components in the macroblock are in terms of bytes, but actually they are bitwise. Moreover, the codes of the macroblocks belonging to the same slice are not byte-aligned between the macroblocks. Here, byte-alignment indicates that bits are stuffed so that the subsequent code begins at a byte boundary. The number of bits to be added for the bit stuffing in a given slice is not known till the bitwise rates of all the macroblocks belonging to the slice are known. Pseudo conversion of the bitwise rate of a macroblock, $s_{MB}$ into the bytewise rate, $S_{MB}$, is done according to the following equation.

$$S_{MB} = \lceil (s_{slice} + s_{MB})/8 \rceil - \lceil s_{slice}/8 \rceil \qquad \text{[Math.19]}$$

where $s_{slice}$ is the bitwise rate of the slice and indicates a total of bitwise rate of macroblocks belonging to the slice having been encoded so far. Similarly, the rates of the DC components and AC components of a macroblock can also be calculated in terms of bytes in a pseudo manner. With this method, since the rate is evaluated by rounding thereof up to bytes all the time, the rate can be estimated conservatively. Thus, the rate control can be guaranteed. In addition, with this method, the bytewise code length of a macroblock might be estimated to be smaller or larger than actual. However, since a plurality of macroblocks is assembled in a segment, these errors are canceled on an average.

(3) Overhead of First Macroblock in Slice

For the first macroblock in a slice, since there is no predictor macroblock and the prediction cannot be performed, the DC components are predicted from zero all the time. Therefore, the average rate of the first macroblock in a slice tends to be larger than the average rate of each of the subsequent macroblocks in the slice. In order to cancel this overhead, allocation of the budget among the macroblocks may be changed so that the budget allocated to the first macroblock in a slice becomes larger than the budget allocated to each of the subsequent macroblocks in the slice.

As described above, since the present embodiment of the image encoding apparatus controls the encoding portion by the unit of the small number of macroblocks as a segment, the rate control is expedited and a required circuit scale can be reduced. In addition, since the macroblocks are extracted from pseudo-random positions on a screen by shuffling, the image quality of the image as a whole can be homogenized and improved. For example, even if the image data with large fluctuation in terms of entropy is encoded, since the size of the output bit streams can be homogenized, there is no chance that the constraint of the buffer is broken. Therefore, it is possible to simultaneously encode a plurality of frames using multiple threads and assemble them to a stream later. For the same reason, editing such as cut and insert after encoding is possible.

6. Intermediate Buffer for Reordering of Encoded Stream

A method of storing an interim result in a buffer, i.e., an intermediate buffer, with a size in proportion to the final stream size and outputting the final stream after re-ordering of codes will be described. This method has merit in that a required buffer can be made small as compared with a method of preparing a buffer for storing codes of the macroblock for each macroblock. An example of this configuration will be described in the following embodiment.

Second Embodiment

Figure 6:
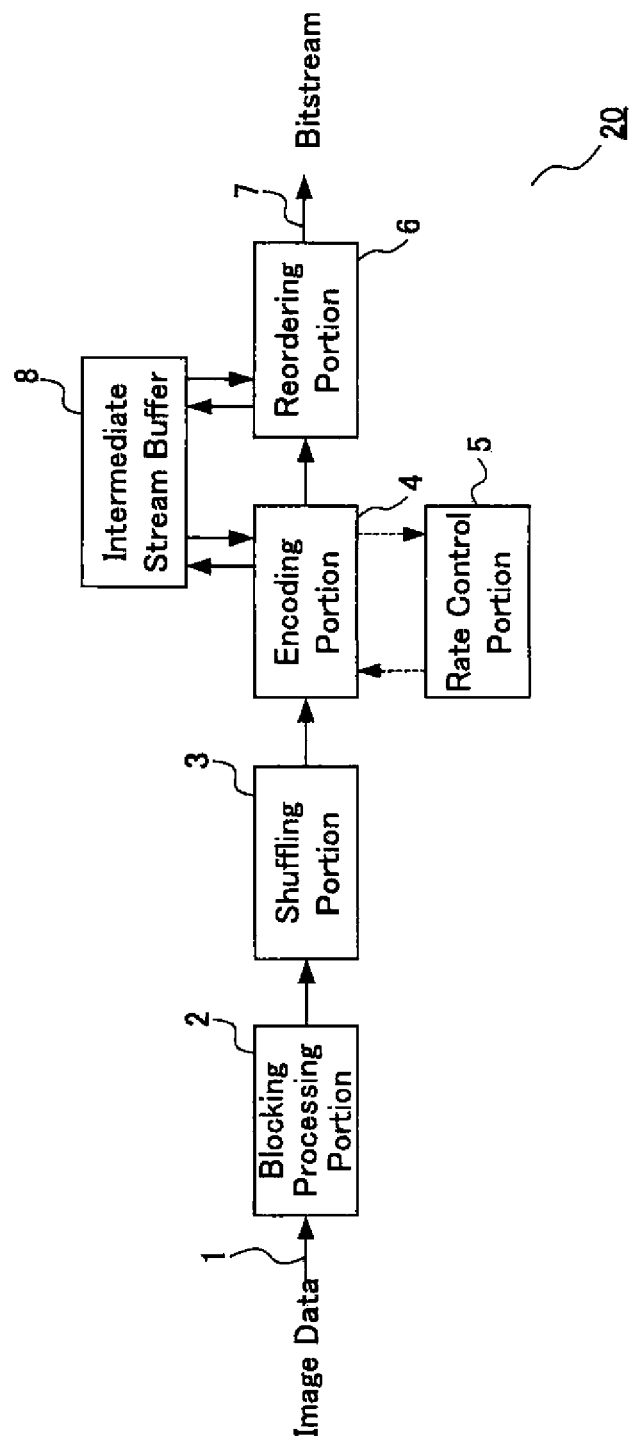
FIG. 6 is a block diagram illustrating a second embodiment of an image encoding apparatus according to the present invention.

A second embodiment of an image encoding apparatus according to the present invention will be described referring to FIG. 6. As shown in FIG. 6, the present embodiment of the image encoding apparatus 20 is substantially similar to the image encoding apparatus of the above-mentioned first embodiment except that an intermediate stream buffer 8 is provided between the encoding portion 4 and the reordering portion 6. The same reference numerals are assigned to similar configurations and descriptions thereof will be omitted.

Figure 7:
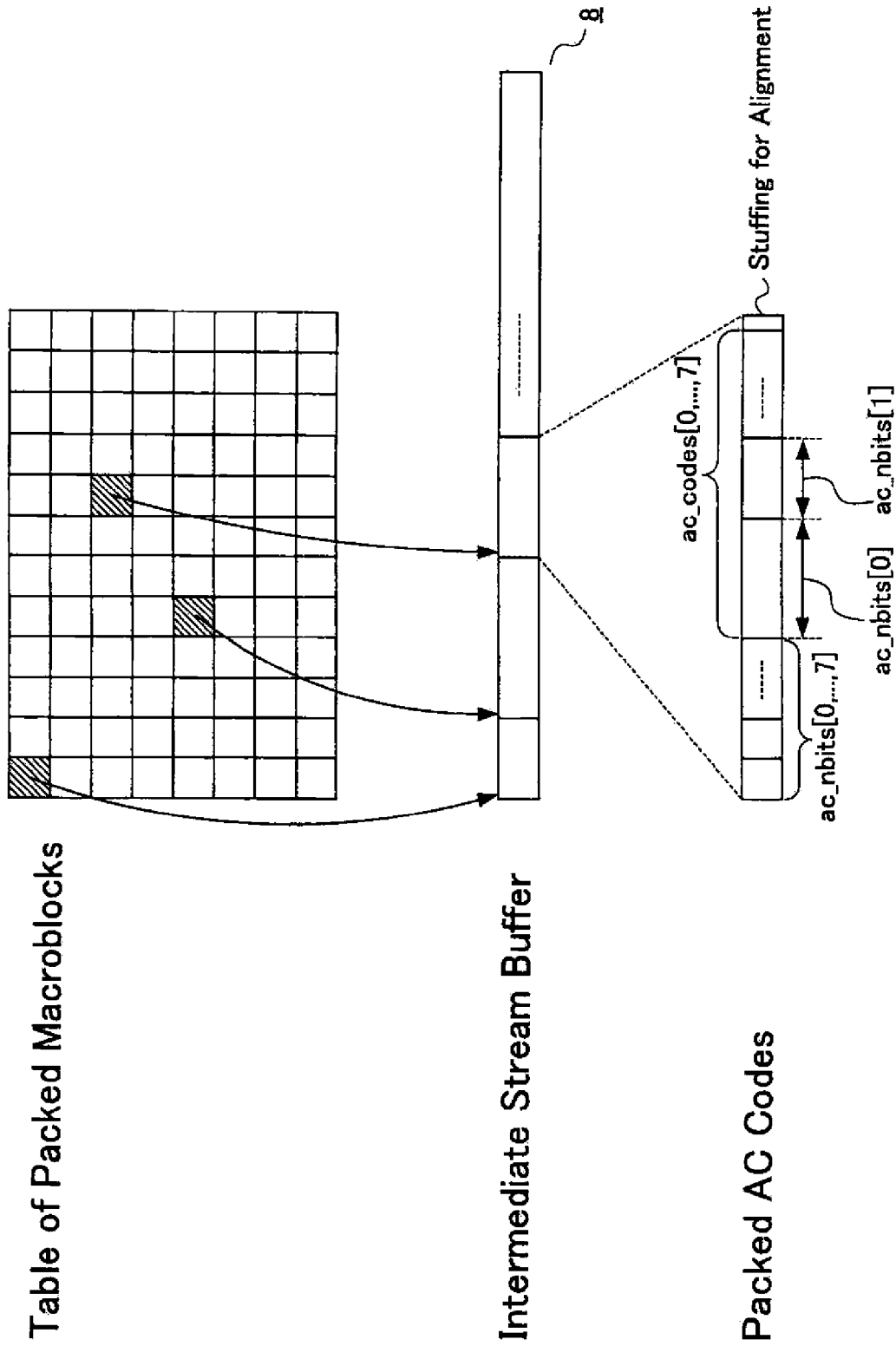
FIG. 7 is a diagram illustrating an intermediate stream buffer of FIG. 6.
Figure 8:
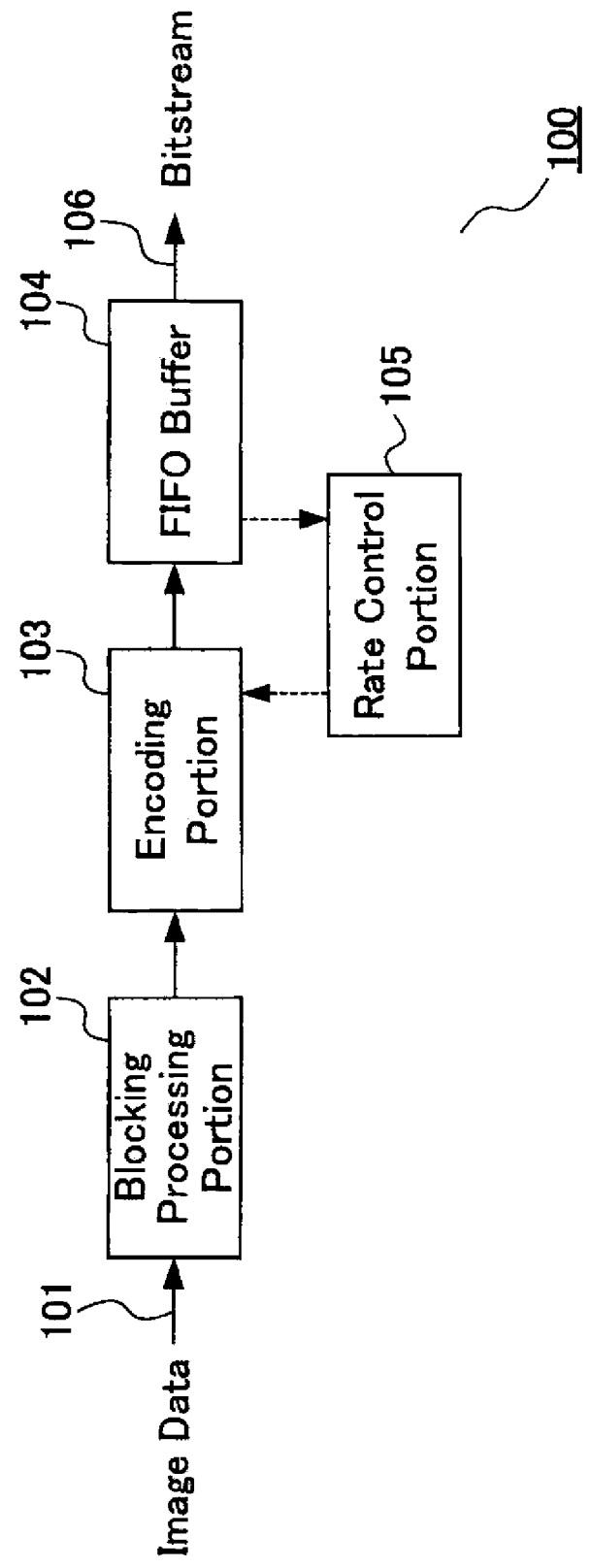
FIG. 8 is a block diagram illustrating a prior-art image encoding apparatus.

An example of a structure of the intermediate stream buffer 8 is shown in FIG. 7. Data of the encoded macroblock is stored as a packed macroblock that can be accessed in the scan order. The packed macroblock includes a pointer to the packed AC codes with variable lengths in addition to the quantization scale and the DC components that are not encoded. In FIG. 7, the packed macroblock is indicated by a shaded square and the pointer by a bent arrow.

The packed macroblocks are arranged according to a table alignment that can be accessed in the scan order for the DC prediction and reordering of codes. In the intermediate stream buffer 8, codes are stored in the order of being shuffled. Since the packed AC codes have different lengths according to the macroblock, a memory block is dynamically allocated from the intermediate stream buffer 8. In an MPEG-2 stream, it is required that the codes of DC components and AC components are arranged alternately for each DCT block, and access to the code of each DCT block is required when the final stream is created. Thus, the AC code length and the AC code are stored for each DCT block. Therefore, the packed AC code includes a bit length of the AC codes ($ac\_nbits[0, \ldots, 7]$) and actual AC codes ($ac\_codes[0, 1, \ldots, 7]$) of the respective DCT blocks included in the macroblock.

Since the AC codes are bitwise, stuffing for byte- or word-alignment is inserted at the end of the packed AC codes. The bytewise size of the intermediate stream buffer, $B_{intermediate}$, is only required to satisfy the following condition, for example.

$$B_{intermediate} = B_{picture} + (2N_{blocks\ in\ MB} + 2)N_{MBs} \qquad [\text{Math.20}]$$

where $B_{picture}$ represents a budget of the image data as a whole. $N_{MBs}$ represents the number of macroblocks included in the image data. $N_{blocks\ in\ MB}$ represents the number of DCT blocks included in a macroblock, and $N_{blocks\ in\ MB} = 8$, when the chroma sub-sampling is 4:2:2. The second term in the right-hand side represents the overheads due to $ac\_nbits[\ldots]$ and the stuffing. Here, $ac\_nbits[i]$ is assumed to be 16 bits, that is, 2 bytes. In addition, the stuffing is assumed to be stuffing to the word boundary. $B_{intermedaite}$ can be made smaller by subtracting the size of overhead of other headers not stored in the intermediate buffer or the like.

With the buffer of the prior-art storing codes of the macroblock for each macroblock, the maximum rate of a macroblock is allocated to the buffer of each macroblock; however, in the image encoding apparatus according to the present invention, the required buffer capacity can be reduced to the sum of an allocated rate of the image data as a whole and a value obtained by multiplying a fixed-length overhead by a total number of the macroblocks.

As described above, with the present embodiment of the image encoding apparatus, in addition to the characteristics of the first embodiment of the image encoding apparatus, the required buffer capacity can be made smaller than the method of preparing a buffer storing a code of each macroblock.

Although embodiments of the present invention have been described, the present invention is not limited to the above-mentioned embodiments. Furthermore, the most suitable advantages incurred by the present invention are only listed in the embodiments of the present invention, and the advantages by the present invention are not limited to those described in the embodiments of the present invention.

For example, in the above embodiment, although an encoding method conforming to MPEG-2 is described, the present invention is not limited thereto. The present invention can be widely applied to encoding methods using prediction such as MPEG-2 DC prediction including JPEG as long as it is constituted by similar macroblocks, and moreover, it is not only for intra-frame coding, but even for encoding processing compliant with the inter-frame coding method such as encoding methods compliant with MPEG-2; for example, the present invention can be applied to a portion of the intra-frame coding processing such as intra-slice processing.

REFERENCE SIGNS LIST

1. Input portion
2. Blocking processing portion
3. Shuffling portion
4. Encoding portion
5. Rate control portion
6. Reordering portion
7. Output portion
8. Intermediate stream buffer
10. First embodiment of image encoding apparatus
20. Second embodiment of image encoding apparatus
101. Input portion
102. Blocking processing portion
103. Encoding portion
105. Rate control portion
106. Output portion
100. Prior-art image encoding apparatus

The invention claimed is:

1. An image encoding apparatus for encoding image data indicative of an image, the apparatus comprising:
   a shuffling portion which collects and shuffles a plurality of macroblocks constituting the image data from respective positions within the image;
   an encoding portion which performs space-frequency transform and entropy encoding on the plurality of macroblocks collected and shuffled by the shuffling portion, as a base unit; and
   a rate control portion which controls the encoding portion to adjust, with the plurality of macroblocks as the base unit, a rate of the plurality of macroblocks after the encoding, wherein the rate control portion judges, for each macroblock of the plurality of macroblocks, whether a predictive quantity, to be predicted from a predictor macroblock of each macroblock, is known or not, and controls the encoding portion by performing rate correction, based on a number of macroblocks each judged as having a predictive quantity which is not known from among macroblocks which have already been encoded in the image data as a whole including the plurality of macroblocks, wherein an encoded macroblock whose predictive quantity, to be predicted from an associated predictor macroblock, is not known is defined as an open macroblock, and the rate control portion calculates an allocated rate of the plurality of macroblocks by multiplying the allocated rate of the image data by a value obtained by dividing a number of macroblocks in the plurality of macroblocks by a number of macroblocks in the image data, calculates a correction to the allocated rate of the plurality of macroblocks by multiplying a difference between a number of the open macroblocks in the image data as a whole before and after the plurality of macroblocks are encoded by the encoding portion by a difference between a maximum rate of a predictive code of the open macroblock and an average rate of the predictive code, calculates a corrected, allocated rate by adding the correction to the allocated rate of the plurality of macroblocks, and controls the encoding portion so that the rate after the encoding of the plurality of macroblocks is equal to or less than the corrected, allocated rate.

2. An image encoding apparatus according to claim 1, wherein the predictive code includes a code of DC prediction.

3. An image encoding apparatus according to claim 1, wherein the space-frequency transform is executed by DCT transform, and the rate control portion determines a quantization scale used when the plurality of macroblocks are quantized by the encoding portion, on the basis of the corrected, allocated rate.

4. An image encoding apparatus according to claim 1, wherein the image data includes a slice layer constituted by a second plurality of macroblocks aligned in a single row, the shuffling portion creates position information of the second plurality of macroblocks including scan order in the slice layer when the second plurality of macroblocks are shuffled, and the rate control portion calculates a rate of a macroblock of the second plurality of macroblocks aligned in a single row constituting the slice layer in terms of bytes by subtracting a value obtained by dividing a bitwise total rate of encoded macroblocks and overhead associated therewith in the second plurality of macroblocks aligned in a single row constituting the slice layer by 8, and rounding thus obtained quotient up to an integer, from a value obtained by dividing a sum of a bitwise rate of the macroblock of the second plurality of macroblocks aligned in the single row constituting the slice layer and the bitwise total rate of the encoded macroblocks and overhead associated therewith in the second plurality of macroblocks aligned in the single row constituting the slice layer by 8, and rounding thus obtained quotient up to an integer.

5. An image encoding apparatus according to claim 4, wherein the rate control portion calculates an allocated rate of each macroblock in the slice layer so that the allocated rate of a macroblock at the beginning of the slice layer is larger than the allocated rate of other macroblocks of the slice layer.

6. An image encoding apparatus according to claim 1, further comprising:
an intermediate buffer portion for temporarily storing coded data encoded by the encoding portion; and
a reordering portion for reordering the coded data to be aligned in an order before being shuffled by the shuffling portion by reading, in scan order, the coded data stored in the intermediate buffer portion, and outputting the coded data, wherein the intermediate buffer portion has a capacity equivalent to the sum of an allocated rate of the image data as a whole and a value obtained by multiplying a fixed-length overhead by a total number of the macroblocks.

7. An image encoding method for encoding image data indicative of an image, the method comprising:
a shuffling step of collecting and shuffling a plurality of macroblocks constituting the image data from respective positions within the image;
an encoding step of performing space-frequency transform and entropy encoding on the plurality of macroblocks collected and shuffled in the shuffling step, as a base unit; and
a rate control step of controlling the encoding step to adjust, with the plurality of macroblocks as the base unit, a rate of the plurality of macroblocks after the encoding, wherein the rate control step has a step of judging, for each macroblock of the plurality of macroblocks, whether a predictive quantity, to be predicted from a predictor macroblock of each macroblock, is known or not, and a step of controlling the encoding step by performing rate correction, based on a number of macroblocks each judged as having a predictive quantity which is not known from among macroblocks which have already been encoded in the image data as a whole including the plurality of macroblocks, wherein an encoded macroblock whose predictive quantity, to be predicted from an associated predictor macroblock, is not known is defined as an open macroblock, and the rate control step has a step of calculating an allocated rate of the plurality of macroblocks by multiplying the allocated rate of the image data by a value obtained by dividing a number macroblocks in the plurality of macroblocks by a number of macroblocks in the image data, a step of calculating a correction to the allocated rate of the plurality of macroblocks by multiplying a difference between a number of the open macroblocks in the image data as a whole before and after the plurality of macroblocks are encoded in the encoding step, by a difference between a maximum rate of a predictive code of the open macroblock and an average rate of the predictive code, calculating a corrected, allocated rate by adding the correction to the allocated rate of the plurality of macroblocks, and a step of controlling the encoding step so that the rate after the encoding of the plurality of macroblocks is equal to or less than the corrected, allocated rate.

8. An image encoding method according to claim 7, wherein the predictive code includes a code of DC prediction.

9. An image encoding method according to claim 7, wherein the space-frequency transform is executed by DCT transform, and the rate control step has a step of determining a quantization scale used when the plurality of macroblocks are quantized in the encoding step, on the basis of the corrected, allocated rate.

10. An image encoding method according to claim 7, wherein the image data includes a slice layer constituted by a second plurality of macroblocks aligned in a single row, the shuffling step has a step of creating position information of the second plurality of macroblocks including scan order in the slice layer when the second plurality of macroblocks are shuffled, and the rate control step has a step of calculating a rate of a macroblock of the plurality of macroblocks aligned in a single row constituting the slice layer in terms of bytes by subtracting a value obtained by dividing a bitwise total rate of encoded macroblocks and overhead associated therewith in the plurality of macroblocks aligned in the single row constituting the slice layer by 8, and rounding thus obtained quotient up to an integer, from a value obtained by dividing a sum of a bitwise rate of the macroblock of the plurality of macroblocks aligned in the single row constituting the slice layer and the bitwise total rate of the encoded macroblocks and overhead associated therewith in the plurality of macroblocks aligned in the single row constituting the slice layer by 8, and rounding thus obtained quotient up to an integer.

11. An image encoding method according to claim 10, wherein the rate control step has a step of calculating an allocated rate of each macroblock in the slice layer so that the allocated rate of a macroblock at the beginning of the slice layer is larger than the allocated rate of other macroblocks of the slice layer.

12. An image encoding method according to claim 7, further comprising:
a temporarily storing step of temporarily storing coded data encoded in the encoding step; and a reordering step of reordering the coded data to be aligned in an order before being shuffled in the shuffling step by reading, in scan order, the coded data stored in the temporarily storing step, and outputting the coded data, wherein the temporarily storing step has a step of storing the coded data in a buffer having a capacity equivalent to the sum of an allocated rate of the image data as a whole and a value obtained by multiplying a fixed-length overhead by a total number of the macroblocks.

* * * * *